United States Patent [19]

Hartl

[11] Patent Number: 4,765,757
[45] Date of Patent: Aug. 23, 1988

[54] SELF-ALIGNING SPHERICAL BUSHING MEANS

[75] Inventor: Werner Hartl, Plainsboro, N.J.

[73] Assignee: Roller Bearing Company of America, West Trenton, N.J.

[21] Appl. No.: 133,598

[22] Filed: Dec. 14, 1987

[51] Int. Cl.$^4$ ............................................. F16C 25/04
[52] U.S. Cl. ..................................................... 384/213
[58] Field of Search ............... 384/213, 214, 206, 145, 384/146, 203, 204, 208, 209, 210, 291

[56] References Cited

U.S. PATENT DOCUMENTS

| | | |
|---|---|---|
| 1,002,614 | 9/1911 | Warren . |
| 1,674,453 | 6/1928 | Sloper . |
| 1,856,304 | 5/1932 | Whitely . |
| 1,947,023 | 2/1934 | Shoemaker . |
| 2,067,034 | 1/1937 | Whitely . |
| 2,397,124 | 3/1946 | Buffington et al. . |
| 2,500,592 | 3/1950 | Whitely . |
| 2,521,731 | 9/1950 | Kennedy . |
| 2,616,771 | 11/1952 | Metzgar . |
| 2,625,448 | 1/1953 | Underwood . |
| 2,825,608 | 3/1958 | Abel ..................................... 384/214 |
| 3,395,951 | 8/1968 | Barr et al. ........................... 384/213 |
| 3,815,964 | 6/1974 | Bendall . |
| 4,459,048 | 7/1984 | Stachuletz ........................... 384/291 |
| 4,558,960 | 12/1985 | Lehtinen et al. .................... 384/373 |

OTHER PUBLICATIONS

"Self-Aligning Spherical Bushing", Roller Bearing Co. of America (1972).

"Spherical Plain Bearings", catalog SF-76, Torrington (Bearing Co.) (no date).

Primary Examiner—Lenard A. Footland
Attorney, Agent, or Firm—Sperry, Zoda & Kane

[57] ABSTRACT

A self-aligning spherical bushing is disclosed to be positionable between an inner member and an outer member to allow movement therebetween. The bushing includes a first outer ring of generally cylindrical shape which includes a spherically concave inner surface. A second ring is included which is also generally cylindrical and includes a cylindrical central opening therethrough and a convex outer surface. The second ring is adapted to be captured within the first ring with the spherical surfaces mated with respect to one another movably. The inner and outer surfaces of the inner ring can include a lubrication groove extending circumferentially therearound. The outer ring can define a lubrication groove about the outer surface thereof. A lubrication aperture can connect the inner and outer surfaces of each ring. The spherical exterior surface of the inner ring is of a smaller spherical diameter than the concave spherical surface of the inner surface of the outer ring in order to provide necessary operating clearances. The outer surface of the inner ring also includes supplementary circular lubrication channels oriented with the plane of the circles parallel to the axis of the second ring and in fluid flow communication with respect to the lubrication aperture extending circumferentially around the outer surface of the inner ring. These circular channels intersect the lubrication channel at right angles and are regularly spaced at equal intervals therealong to eliminate any preferred position between the first and second rings.

19 Claims, 1 Drawing Sheet

SELF-ALIGNING SPHERICAL BUSHING MEANS

BACKGROUND OF THE INVENTION

1. Field Of The Invention

The present invention deals with the field of self-aligning spherical bearings wherein the inner surface of an outer ring and the outer surface of an inner ring are of mated spherical shape to facilitate some element of ball and socket movement of two members with respect to one another. These bearings can be sealed or not sealed and can include multiple inner rings or partial spherical sections. They are normally self-contained and the inner ring is normally captured within the outer ring. Sometimes the outer ring is formed in two sections to facilitate positioning with respect to the inner ring. The present invention utilizes these basic principles with the novel addition of specially shaped lubrication grooves.

2. Description Of The Prior Art

Various lubrication means for spherical bushings have been designed such as those shown in U.S. Pat. No. 1,002,614 issued Sept. 5, 1911 to F. A. Warren on a Centrifugal Oiling Bearing For Car And Other Wheels; and U.S. Pat. No. 1,674,453 issued June 19, 1928 to T. Sloper on a Loose Or Floating Bearing Bush; U.S. Pat. No. 1,856,304 issued May 3, 1932 to R. H. Whiteley on a Self Lubricating Bearing; U.S. Pat. No. 1,947,023 issued Feb. 13, 1934 to F. G. Shoemaker on a Piston Pin Lubrication System; U.S. Pat. No. 2,067,034 issued Jan. 5, 1937 to R. H. Whiteley on a Heat Responsive Self Lubricating Bearing; U.S. Pat. No. 2,397,124 issued Mar. 26, 1946 to M. R. Buffington et al on a Resilient Nonmetallic Bearing; U.S. Pat. No, 2,500,592 issued Mar. 14, 1950 to R. L. Whiteley on a Self-Lubricating, Self-Aligning Bearing; U.S. Pat. No. 2,521,731 issued Sept. 12, 1950 to J. E. Kennedy on a Self-Aligning Bearing; U.S. Pat. No. 2,616,771 issued Nov. 4, 1952 to C. W. Metzgar on a Bearing; U.S. Pat. No. 2,625,448 issued Jan. 13, 1953 to A. F. Underwood on a Bearing Lubrication; U.S. Pat. No. 3,395,951 issued Aug. 6, 1968 to V. L. Barr et al on a Self-Aligning Bushing; U.S. Pat. No. 3,815,964 issued June 11, 1974 to W. H. Bendall on Bearings; U.S. Pat. No. 4,459,048 issued July 10, 1984 to M. Stachuletz on an Oil Film Bearing; and U.S. Pat. No. 4,558,960 issued Dec. 17, 1985 to J. A. Lehtinen et al on a Radial Friction Bearing Assembly.

SUMMARY OF THE INVENTION

The present invention provides a self-aligning spherical bushing which is adapted to be positioned between an inner member and an outer member such that they are movable with respect to one another through multiple degrees of freedom. The spherical bushing includes a first ring which includes a first ring lubrication aperture communicating between the inner surface of the ring and the outer of the ring. The outer first ring surface is generally cylindrical and defines a lubrication groove extending circumferentially therearound in such a manner as to be in fluid flow communication with respect to the first ring lubrication aperture.

The first ring includes an inner first ring surface which is generally spherically concave and can define a fourth lubrication groove extending circumferentially therearound in fluid flow communication with respect to the first ring lubrication aperture to receive lubrication thereof for lubrication of the inner first ring surface. Most usages of the spherical bearing of the present invention will not require a fourth lubrication aperture since only minor spherical misalignment will occur thereby usually maintaining direct fluid flow communication of lubricant from the first ring lubrication aperture into the second lubrication groove defined on the external surface of the second ring. The first ring lubrication aperture extends from the outer first ring surface to the inner ring surface to allow fluid flow communication therebetween.

A second ring is included in the self-aligning bushing of the present invention positioned within the inner first ring surface and defining a mounting channel extending therethrough being generally cylindrical and adapted to receive an inner member therein for movable mounting with respect to the outer member. The mounting channel of the second ring defines a central axis therethrough and a second ring means defines a second ring lubrication aperture extending therethrough to allow a fluid flow communication of lubrication between the inner and outer surface thereof. The outer second ring surface is generally spherically convex and defines a second lubrication groove extending circumferentially therearound and in fluid flow communication with respect to the second ring lubrication aperture. The outer second ring surface is generally spherically convex in shape and is slidably engaged in abutment with respect to the inner first ring surface of generally spherically concave shape to thereby facilitate self-aligning flexibility of the bushing.

The outer second ring surface has a smaller convex spherical diameter than the concave spherical diameter of the inner first ring surface to provide normal operating clearance resulting in the higher stressed areas being between the first ring and the second rings in the central areas therebetween thereby requiring this area to be better lubricated.

The outer second ring surface also includes a supplementary lubrication groove thereon in direct fluid flow communication with respect to the second lubrication groove. This supplementary lubrication groove preferably comprises one or more circular channels defined in the outer second ring surface in such a manner as to intersect the second lubrication groove. The circular channels are adapted to receive lubrication from the second lubrication groove and further distribute this lubrication outwardly toward the outer edges of the outer surface of the second ring. Preferably the circular channels are defined in a plane parallel with respect to the central axis of the mounting channel of the second ring.

The second ring includes an inner second ring surface which is generally cylindrical and defines a mounting channel therein adapted to receive the inner member positioned therein. The inner second ring surface defines a third lubrication groove extending circumferentially therearound and being in fluid flow communication with respect to the second ring lubrication aperture. The second ring lubrication aperture extends from the outer second ring surface to the inner second ring surface to allow fluid flow communication between the second lubrication groove and the third lubrication groove.

Preferably the first and second ring of the present invention are hardened and coated with a dry film lubricant preferably being molybdenum disulfide.

It is further preferred that the concave spherical diameter of the inner first ring surface be greater than the convex spherical diameter of the outer second ring surface to provide necessary operating clearances.

The supplementary lubrication means which basically provides multiple circular channels are defined in such a position such that the circular channels intersect perpendicularly with respect to the second lubrication groove. Also it is preferable that these circular channels are regularly positioned at equal spaces about the second lubrication groove to eliminate any preferred steady state position between the first ring and the second ring. It is also preferable that the spherical movement of the second ring with respect to the first ring extends through a full degree of movement which does not eliminate contact between the second lubrication groove and the circular channels and the inner surface of the first ring means. In this manner contaminants such as dirt and the like will not be able to enter the lubricant carried within the second lubrication groove and the circular channels intersecting perpendicularly therewith.

It is an object of the present invention to provide a self-aligning spherical bushing means positionable between an inner member and an outer member which are movable with respect to one another wherein circular lubrication grooves extend from a conventional circumferential linear lubrication groove to maximize lubrication of the mated spherical surfaces thereof.

It is an object of the present invention to provide a self-aligning spherical bushing means positionable between an inner member and an outer member which are movable with respect to one another wherein the surfaces to be lubricated pass approximately perpendicularly over lubrication grooves throughout a maximum portion of the movement thereof by use of supplementary circular lubrication grooves.

It is an object of the present invention to provide a self-aligning spherical bushing means positionable between an inner member and an outer member which are movable with respect to one another wherein fluid flow communication between the conventional circumferential linear lubrication groove and a plurality of circular supplementary lubrication grooves is provided.

It is an object of the present invention to provide a self-aligning spherical bushing means positionable between an inner member and an outer member which are movable with respect to one another wherein supplementary lubrication means are provided on the second or inner ring means in such a manner as to eliminate any preferred orientation of a steady state position between the first and second ring means.

It is an object of the present invention to provide a self-aligning spherical bushing means positionable between an inner member and an outer member which are movable with respect to one another wherein supplementary lubrication means are provided on the exterior of an inner ring means which has radial symmetry about the axis of the inner ring.

It is an object of the present invention to provide a self-aligning spherical bushing means positionable between an inner member and an outer member which are movable with respect to one another wherein circular lubrication grooves can be cut into the exterior of an inner lubrication ring by a single cutting spindle oriented to move through a circular path perpendicular to the axis of the inner ring.

It is an object of the present invention to provide a self-aligning spherical bushing means positionable between an inner member and an outer member which are movable with respect to one another wherein supplementary lubrication grooves are provided on the exterior surface of an inner ring rather than the interior surface of an outer ring.

It is an object of the present invention to provide a self-aligning spherical bushing means positionable between an inner member and an outer member which are movable with respect to one another wherein all lubrication channels are in fluid flow communication with respect to all other lubrication channels on the interior or exterior surfaces of both the inner and outer rings.

It is an object of the present invention to provide a self-aligning spherical bushing means positionable between an inner member and an outer member which are movable with respect to one another wherein the circular lubrication grooves are spaced symmetrically around the circumference of the spherical exterior surface of the inner ring so that a preferred orientation with respect to the load zone is not necessary.

It is an object of the present invention to provide a self-aligning spherical bushing means positionable between an inner member and an outer member which are movable with respect to one another wherein circular lubrication grooves are positioned on a central portion of the outer surface of the inner ring which places the grooves in the most highly stressed area of the bushing where they will be most effective.

It is an object of the present invention to provide a self-aligning spherical bushing means positionable between an inner member and an outer member which are movable with respect to one another wherein supplementary lubrication grooves are positioned such as to be entirely contained within the outer ring to prevent dirt access and to allow effective sealing in standard bushing configurations.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
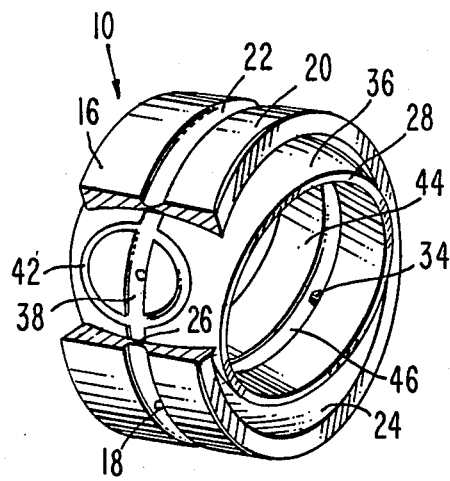
FIG. 1 is a perspective illustration of an embodiment of the self-aligning spherical bushing of the present invention.
Figure 2:
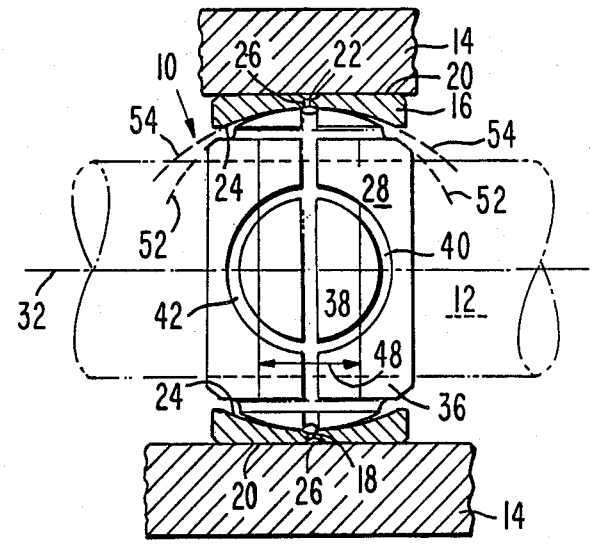
FIG. 2 is a side cross-sectional view of the embodiment shown in FIG. 1 with the bushing shown in position between an inner and outer member which are desired to be movable with respect to one another.
Figure 3:
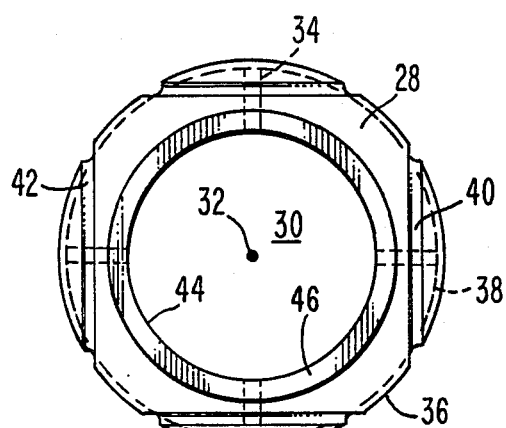
FIG. 3 is a front cross-sectional view of an embodiment of the second or inner ring means of the present invention.
Figure 4:
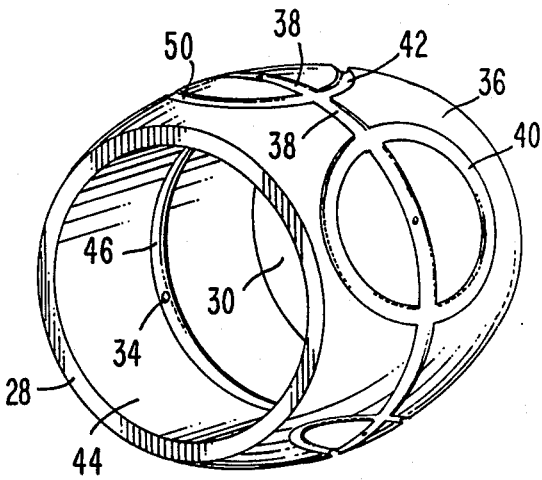
FIG. 4 is a perspective illustration of the inner or second ring means of an embodiment of the present invention.
Figure 5:
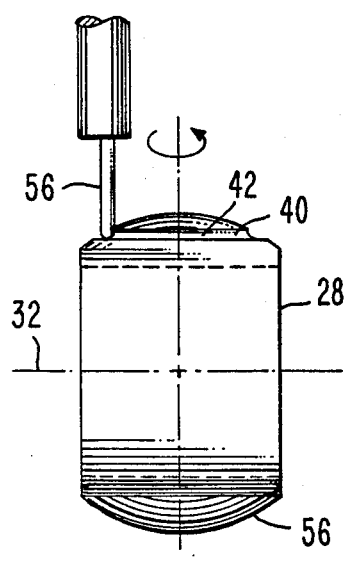
FIG. 5 is a schematic view showing the process for placement of the circular grooves in the outer surface of an inner ring of the present invention.
Figure 6:
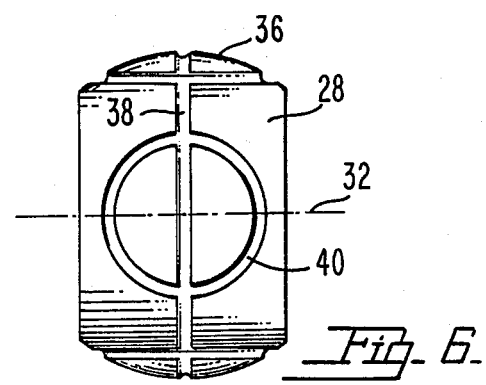
FIG. 6 is a side view of an embodiment of an inner ring of the present invention.

The present invention provides a bushing 10 which is adapted to be positioned between an inner member 12 and an outer member 14 to allow self-aligning spherical movement of these two members with respect to one another.

To achieve this purpose the self-aligning spherical bushing 10 includes a first ring means 16 having a first ring lubrication aperture means 18 extending therethrough to communicate lubrication between the outer first ring surface 20 and inner first ring surface 24.

Outer first ring surface 20 defines a first lubrication groove 22 therein and, similarly, inner first ring surface 24 can define a fourth lubrication groove 26 therein. First ring lubrication aperture means 18 provides fluid flow communication of lubrication between first lubrication groove 22 and fourth lubrication groove 26.

Most usages of the spherical bearing of the present invention will not require a fourth lubrication aperture 26 since only minor spherical misalignment will occur thereby usually maintaining direct fluid flow communication of lubricant from the first ring lubrication aperture 18 into the second lubrication groove 38 defined on the external surface of the second ring 28.

The second ring means 28 is included and defines therethrough a mounting channel 30 being of generally cylindrical shape and defining a central axis 32 extending therethrough. Second ring lubrication aperture means 34 is positioned to extend through second ring means 28 from the outer second ring surface 36 to the inner second ring surface 44. Outer second ring surface 36 defines second lubrication groove 38 therein and inner second ring surface 44 defines a third lubrication groove 46 therein. Second lubrication groove 38 extends circumferentially about outer second ring surface 36 and third lubrication groove 46 extends circumferentially about inner second ring surface 44. Outer second ring surface 36 also defines a supplementary lubrication groove means 40 which may take the form of a circular channel means 42 positioned thereon in fluid flow communication with respect to the second lubrication groove 38 to facilitate the flow of lubrication outwardly away from groove 38. The circular channels 50 are preferably positioned extending through the entire central area 48 of the second ring surface to lubricate outwardly therefrom.

The outer second ring surface 36 is preferably of a spherical shape mated with respect to the spherical shape of the inner first ring surface 24. This mating of spherical shapes allows the ball and socket movement or spherical movement of the inner member 12 with respect to the outer member 14. Preferably the outer second ring surface 36 has a convex spherical diameter 52 which is less than the concave spherical diameter of inner first ring surface 24 to provide normal operating clearances. Also the most heavily loaded contact of the bushing will be in the central area 48 therebetween which is best lubricated. In this manner equal central loading of the bushing will be enhanced and lubrication will be maximized. Formation of the circular channels 50 on the outer second ring surface 36 is easily performed in accordance with the present invention merely by rotating of the second ring means 28 with respect to a cutting spindle 56. Alternatively of course the spindle could be rotated but normally it is most advantageous to have the material rotated and the spindle maintained in a fixed position. With this manufacturing process the plane defined by a circular lubrication channel so cut into the exterior surface of the second ring will always be oriented parallel with respect to the axis of the inner member 12 positioned extending through the mounting channel 30 therein.

The present invention also prefers the positioning of the circular channels 50 to be equally spaced about the exterior surface of the second ring means 28. This equal spacing allows equal loading and a preferred orientation of the first ring means with respect to the second ring means in the load zones will not occur. Thus wear resulting from friction will be equally distributed about the central contacting area 48 of the spherical bushing means of the present invention.

The present invention is also novel in having the circular channels intersect the conventional lubrication groove means perpendicularly. This structure occurs due to the second lubrication groove 38 bisecting the circular channels 50. Also the usage of a single circumferential lubrication channel and a plurality of circular channels spaced regularly thereabout and positioned perpendicular therewith provides an overall fluid flow communication between all circular channels and all lubrication grooves which maximizes lubrication of the contacting surfaces and minimizes friction therebetween. Also there is no additional limitations to movement required by the additional lubrication means.

One of the primary advantages of the present invention is the ability to fully lubricate a spherical bearing even while under heavily loaded conditions. The inclusion of the supplementary circular lubrication channels distributes the lubricant even under a fully loaded condition throughout the bearing surfaces which makes full lubrication possible under any loaded conditions.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A self-aligning spherical bushing means, being positionable between an inner member and an outer member which are movable with respect to each other, said self-aligning spherical bushing means comprising:
(a) a first ring means mountable with respect to the outer member and defining a first ring lubrication aperture means therein, said first ring means further including:
  (1) an outer first ring surface being generally cylindrical and defining a first lubrication groove extending circumferentially therearound in fluid flow communication with respect to said first ring lubrication aperture means, said outer first ring surface being positioned adjacent the outer member;
  (2) an inner first ring surface being generally spherically concave and in fluid flow communication with respect to said first ring lubrication aperture means to receive lubrication therefrom for lubrication of said inner first ring surface, said first ring lubrication aperture means extending from said outer first ring surface to said inner first ring surface to allow fluid flow communication between said first lubrication groove and said inner first ring surface;
(b) a second ring means positioned within said inner first ring surface of said first ring means, said second ring means defining a mounting channel extending therethrough being generally cylindrical and adapted to receive the inner member therein, said mounting channel of said second ring means defining a central axis therethrough, said second ring means defining a second ring lubrication aperture means extending therethrough, said second ring means including:

(1) an outer second ring surface being generally spherically convex and defining a second lubrication groove extending circumferentially therearound and being in fluid flow communication with respect to said second ring lubrication aperture means, said outer second ring surface being of generally spherical convex shape and being in slidable abutment with respect to said inner first ring surface of generally spherical concave shape to facilitate self-aligning flexibility of the spherical bushing means, said outer second ring surface being of a smaller convex spherical diameter than the concave spherical diameter of said inner first ring surface to provide operating clearances, said outer second ring surface further defining a supplementary lubrication groove means thereon in direct fluid flow communication with respect to said second lubrication groove, said supplementary lubrication groove means comprising circular channel means defined in said outer second ring surface intersecting said second lubrication groove, said circular channel means adapted to receive lubrication from said second lubrication groove, said circular channel means being oriented in a plane parallel with respect to said central axis of said mounting channel of said second ring means; and (2) an inner second ring surface being generally cylindrical and defining said mounting channel therein adapted to receive the inner member positioned therein, said inner second ring surface defining a third lubrication groove extending circumferentially therearound and being in fluid flow communication with respect to said second ring lubrication aperture means, said second ring lubrication aperture means extending from said outer second ring surface to said inner second ring surface to allow fluid flow communication between said second lubrication groove and said third lubrication groove.

2. The self-aligning spherical bushing means as defined in claim 1 wherein said inner first ring surface defines a fourth lubrication groove extending circumferentially therearound in fluid flow communication with respect to said first lubrication groove through said first lubrication aperture means.

3. The self-aligning spherical bushing means as defined in claim 1 wherein said first ring means and said second ring means are hardened.

4. The self-aligning spherical bushing means as defined in claim 1 wherein said first ring means and said second ring means are grind coated with dry film lubricant.

5. The self-aligning spherical bushing means as defined in claim 3 wherein said dry film lubricant is molybdenum disulfide.

6. The self-aligning spherical bushing means as defined in claim 1 wherein the concave spherical diameter of said inner first ring surface is greater than the convex spherical diameter of said outer second ring surface to allow for necessary operating clearances and resulting in the higher stressed areas between said first ring means and said second ring means to be in the central area therebetween which is better lubricated.

7. The self-aligning spherical bushing means as defined in claim 1 wherein said first ring means and said second ring means are formed of vacuum processed bearing quality steel.

8. The self-aligning spherical bushing means as defined in claim 1 wherein said first ring lubrication aperture means comprises at least two first ring lubrication apertures extending between said first lubrication groove and said inner first ring surface.

9. The self-aligning spherical bushing means as defined in claim 1 wherein said first ring lubrication aperture means comprises two first ring lubrication apertures extending between said first lubrication groove and said inner first ring surface.

10. The self-aligning spherical bushing means as defined in claim 1 wherein said second ring lubrication aperture means comprises at least two second ring lubrication apertures extending between said second lubrication groove and said third lubrication groove.

11. The self-aligning spherical bushing means as defined in claim 1 wherein said second ring lubrication aperture means comprises two second ring lubrication apertures extending between said second lubrication groove and said third lubrication groove.

12. The self-aligning spherical bushing means as defined in claim 1 wherein said circular channels intersect perpendicularly with respect to said second lubrication groove defined on said outer second ring surface.

13. The self-aligning spherical bushing means as defined in claim 1 wherein said circular channel means are located at equally spaced positions around said second lubrication groove.

14. The self-aligning spherical bushing means as defined in claim 1 wherein said circular channel means comprises at least two circular channels intersecting said second lubrication groove defined on said outer second ring surface.

15. The self-aligning spherical bushing means as defined in claim 1 wherein said circular channel means comprises four circular channels intersecting said second lubrication groove defined on said outer second ring surface.

16. The self-aligning spherical bushing means a defined in claim 15 wherein said circular channel means are located at equally spaced positions along said second lubrication groove of said outer second ring surface in order to prevent any preferred orientation position between said first ring means and said second ring means.

17. The self-aligning spherical bushing means as defined in claim 14 wherein said circular channel means are all in fluid flow communication with respect to one another by each being in fluid flow communication with respect to said second lubrication groove.

18. The self-aligning spherical bushing means as defined in claim 1 wherein said circular channel means are maintained in constant abutment with respect to said inner first ring surface to prevent contamination from entering therein.

19. A self-aligning spherical bushing means, being positionable between an inner member and an outer member which are movable with respect to each other, said self-aligning spherical bushing means comprising:

(a) a first ring means of vacuum processed bearing quality steel mountable with respect to the outer member and defining a first ring lubrication aperture means therein, said first ring lubrication aperture means comprising two first ring lubrication apertures positioned diametrically opposite from each other on said first ring means, said first ring means being hardened and coated with molybdenum disulfide dry lubricant, said first ring means further including:
(1) an outer first ring surface being generally cylindrical and defining a first lubrication groove extending circumferentially therearound in fluid flow communication with respect to said first ring lubrication aperture means, said outer first ring surface being positioned adjacent the outer member;
(2) an inner first ring surface being generally spherically concave and defining a fourth lubrication groove extending circumferentially therearound and in fluid flow communication with respect to said first ring lubrication aperture means to receive lubrication therefrom for lubrication of said inner first ring surface, said first ring lubrication aperture means extending from said outer first ring surface to said inner first ring surface to allow fluid flow communication between said first lubrication groove and said fourth lubrication groove;

(b) a second ring means of vacuum processed bearing quality steel positioned within said inner first ring surface of said first ring means, said second ring means defining a mounting channel extending therethrough being generally cylindrical and adapted to receive the inner member therein, said mounting channel of said second ring means defining a central axis therethrough, said second ring means defining a second ring lubrication aperture means extending therethrough, said second ring lubrication aperture means comprising two second ring lubrication apertures positioned diametrically opposite from each other on said second ring means, said second ring means being hardened and coated with molybdenum disulfide dry lubricant, said second ring means including:
(1) an outer second ring surface being generally spherically convex and defining a second lubrication groove extending circumferentially therearound and being in fluid flow communication with respect to said second ring lubrication aperture means, said outer second ring surface being of generally spherical convex shape and being in slidable abutment with respect to said inner first ring surface of generally spherical concave shape to facilitate self-aligning flexibility of the spherical bushing means, said outer second ring surface further defining a supplementary lubrication groove means thereon in direct fluid flow communication with respect to said second lubrication groove, said supplementary lubrication groove means comprising circular channel means defined in said outer second ring surface intersecting said second lubrication groove, said circular channel means adapted to receive lubrication from said second lubrication groove, said circular channel means being oriented in a plane parallel with respect to said central axis of said mounting channel of said second ring means, said circular channel means comprising four circular channels positioned equally spaced about said second lubrication groove in order to facilitate lubrication therearound and to prevent any preferred orientation position between said first ring means and said second ring means, said circular channels intersecting perpendicularly with respect to said second lubrication groove to facilitate lubrication in areas adjacent to said second lubrication groove, said circular channels being maintained in constant abutment with respect to said inner first ring surface to prevent contamination from entering therein; and
(2) an inner second ring surface being generally cylindrical and defining said mounting channel therein adapted to receive the inner member positioned therein, said inner second ring surface defining a third lubrication groove extending circumferentially therearound and being in fluid flow communication with respect to said second ring lubrication aperture means, said second ring lubrication aperture means extending from said outer second ring surface to said inner second ring surface to allow fluid flow communication between said second lubrication groove and said third lubrication groove.

* * * * *